United States Patent
Harijan

(10) Patent No.: US 10,057,648 B1
(45) Date of Patent: Aug. 21, 2018

(54) MODIFIED CHANNEL SURFING BASED ON MONITORED VIEWING HABITS

(71) Applicant: SLING MEDIA PVT LTD., Bangalore (IN)

(72) Inventor: Kuppappa Harijan, Karnataka (IN)

(*) Notice: Subject to any disclaimer, the term of this patent is extended or adjusted under 35 U.S.C. 154(b) by 0 days.

(21) Appl. No.: 15/588,927

(22) Filed: May 8, 2017

(51) Int. Cl.
| | |
|---|---|
| *H04N 21/25* | (2011.01) |
| *H04N 21/466* | (2011.01) |
| *H04N 21/482* | (2011.01) |
| *H04N 21/45* | (2011.01) |
| *H04N 21/472* | (2011.01) |
| *H04N 21/438* | (2011.01) |
| *H04N 21/84* | (2011.01) |
| *H04N 21/488* | (2011.01) |

(52) U.S. Cl.
CPC ....... *H04N 21/4667* (2013.01); *H04N 21/251* (2013.01); *H04N 21/4383* (2013.01); *H04N 21/45* (2013.01); *H04N 21/4532* (2013.01); *H04N 21/466* (2013.01); *H04N 21/47214* (2013.01); *H04N 21/4826* (2013.01); *H04N 21/4882* (2013.01); *H04N 21/84* (2013.01)

(58) Field of Classification Search
CPC ............... H04N 21/251; H04N 21/466; H04N 21/4532; H04N 21/4882; H04N 21/45; H04N 21/4667; H04N 21/47214; H04N 21/4826
See application file for complete search history.

(56) References Cited

U.S. PATENT DOCUMENTS

| | | | |
|---|---|---|---|
| 8,281,341 B2 | 10/2012 | Ellis et al. | |
| 2002/0104081 A1* | 8/2002 | Candelore | H04H 60/43 725/9 |
| 2003/0084448 A1* | 5/2003 | Soundararajan | H04N 21/443 725/46 |
| 2004/0117831 A1 | 6/2004 | Ellis et al. | |
| 2005/0160458 A1 | 7/2005 | Baumgartner | |
| 2005/0204387 A1 | 9/2005 | Knudson et al. | |
| 2007/0118848 A1 | 5/2007 | Schwesinger et al. | |
| 2008/0235732 A1* | 9/2008 | Han | H04N 5/44543 725/46 |
| 2009/0060469 A1* | 3/2009 | Olague | H04N 7/17318 386/297 |
| 2012/0011529 A1* | 1/2012 | Howcroft | H04L 65/4076 725/14 |
| 2013/0035086 A1 | 2/2013 | Chardon et al. | |
| 2016/0366075 A1* | 12/2016 | Dong | H04L 51/04 |

* cited by examiner

*Primary Examiner* — Robert J Hance
(74) *Attorney, Agent, or Firm* — Kilpatrick Townsend & Stockton, LLP

(57) ABSTRACT

Various arrangements for modified channel surfing are presented. Viewing habits of users of a television receiver may be monitored. A preferred television channel list indicating a plurality of preferred television channels based on the monitored viewing habits of users of the television receiver may be determined. User input requesting a channel surfing mode change to a preferred television channel mode may be received via a remote control. The channel surfing mode may be set to the preferred television channel mode. A channel up command or channel down command may be received by the television receiver from the remote control. A first television channel may be selected from the preferred television channel list in response to: the channel up command or channel down command; and the television receiver being set to the preferred television channel mode.

18 Claims, 6 Drawing Sheets

MODIFIED CHANNEL SURFING BASED ON MONITORED VIEWING HABITS

BACKGROUND

People are creatures of habit. When viewing television, viewers tend to watch programming on preferred television channels and pay little attention to other television channels. With the large number of television channels available to viewers, viewers can find it inconvenient to search for and select their favorite channels. Further, over time, the user's preferred channels may shift. For instance, during football season, a viewer may prefer television channels that carry football games, but during baseball season, the viewer may prefer television channels that carry baseball games. Such a viewer may find it useful to have the ability to quickly switch among his favorite channels.

SUMMARY

Various systems, methods, and computer-readable mediums are detailed for modified channel surfing. Viewing habits of users of a television receiver may be monitored. A preferred television channel list may be determined that indicates a plurality of preferred television channels based on the monitored viewing habits of users of the television receiver. User input may be received that requests a channel surfing mode change to a preferred television channel mode. The channel surfing mode may be set to the preferred television channel mode. A channel up command or channel down command may be received, wherein the channel up command is based on a user pressing a designated channel up button or a designated channel down button on the remote control. A first television channel may be selected from the preferred television channel list in response to: the channel up command or channel down command; and the television receiver being set to the preferred television channel mode. The first television channel may then be output for presentation.

Arrangements of such systems, methods, and computer-readable mediums may include one or more of the following features: The viewing habits of the users of the television receiver may indicate an incidence count of a plurality of television channels being output for at least a threshold period of time. The viewing habits of the users of the television receiver may indicate a total time duration of each of a plurality of television channels being output within a rolling time window. Prior to outputting the first television channel, the first television channel may be selected from the preferred television channel list based on the first television channel being the highest ranked television channel on the preferred television channel list. While outputting the first television channel from the preferred television channel list, receive, via a remote control, a second channel up command or a second channel down command, wherein the second channel up command or the second channel down command is based on the user pressing the designated channel up button or the designated channel down button on the remote control. A second television channel may be selected from the preferred television channel list based on the second television channel being the next ranked television channel on the preferred television channel list from the first television channel. The second television channel selected from the preferred television channel list may be output in response to the channel up command or channel down command and the television receiver being set to the preferred television channel mode. Prior to outputting the first television channel, the first television channel may be selected from the preferred television channel list based on the first television channel being numerically a next channel on the preferred television channel list from a currently-output television channel. User input may be received requesting the channel surfing mode change from the preferred television channel mode to an incremental channel change mode. The channel surfing mode may be set to the incremental television channel mode. A second channel up command may be received, wherein the channel up command is based on the user pressing the designated channel up button on the remote control. A second television channel may be output for presentation based on: the second television channel being a numerically next greater television channel from a previously-tuned television channel; the second channel up command; and the television receiver being set to the incremental channel change mode. In response to setting the channel surfing mode to the preferred television channel mode, the preferred television channel list may be output for presentation as an overlay over television programming being output by the television receiver. A timer may be received for a second television channel of the preferred television channel listing from a television service provider. The second television channel may be recorded for a period of time based on the timer received from the television service provider and the second television channel being listed on the preferred television channel listing. Data indicative of a popular television program may be received on a second television channel of the preferred television channel listing from a television service provider. A reminder may be output for presentation based on the data indicative of the popular television program based on: the television receiver not currently outputting the second television channel and the second television channel being part of the preferred television channel listing. A predefined channel set configuration may be determined from a plurality of predefined channel set configurations based on the preferred television channel listing, wherein the predefined channel set configuration comprises the plurality of preferred television channels.

DETAILED DESCRIPTION

A television receiver can monitor viewing habits of users. To do this, the television receiver may monitor which television channels are requested by users for output and/or the duration that such television channels are output. Based upon this compiled data, a television receiver may create a list of television channels that are preferred by users that use the television receiver. This preferred list of television channels can be used in multiple ways. One way which users may find particularly useful is enabling a preferred channel surfing mode. A preferred channel surfing mode may repurpose channel up and channel down buttons on a remote control such that channel surfing occurs only within the preferred list of television channels. When the television receiver is not set to the preferred channel surfing mode, the channel up and channel down buttons may increase and decrease, respectively, the television channel being output for presentation incrementally based on the assigned channel number. In contrast, the preferred channel surfing mode may be limited to a predefined number of channels, which can be set by the user or by the television service provider, and may be ranked according to the viewing habits monitored by the television receiver.

Additionally, the preferred list of television channels may be used for providing reminders and setting record timers. A television service provider may transmit reminders for popular television channels and data that define timers for recording on some or all television channels broadcast by the television service provider. The television receiver, based upon the locally maintained preferred list of television channels, can use the reminders and timers received from a television service provider to provide users of the television receiver with customized reminders and recordings of popular television programs based upon their preferred list of television channels. As an additional use for the determined preferred list of television channels, the television receiver may have access to data indicative of predefined channel set configurations. Based upon the preferred list of television channels, the television receiver may output a recommendation for a different predefined channel set configuration than what is currently authorized at the television receiver. This alternative predefined channel set configuration may include more television channels that are similar to those preferred by the user or may be a more restrictive predefined channel set configuration that includes fewer television channels but still includes some or all of the television channels listed in the preferred list of television channels. Additional details regarding these embodiments are provided in relation to the figures.

Figure 1:
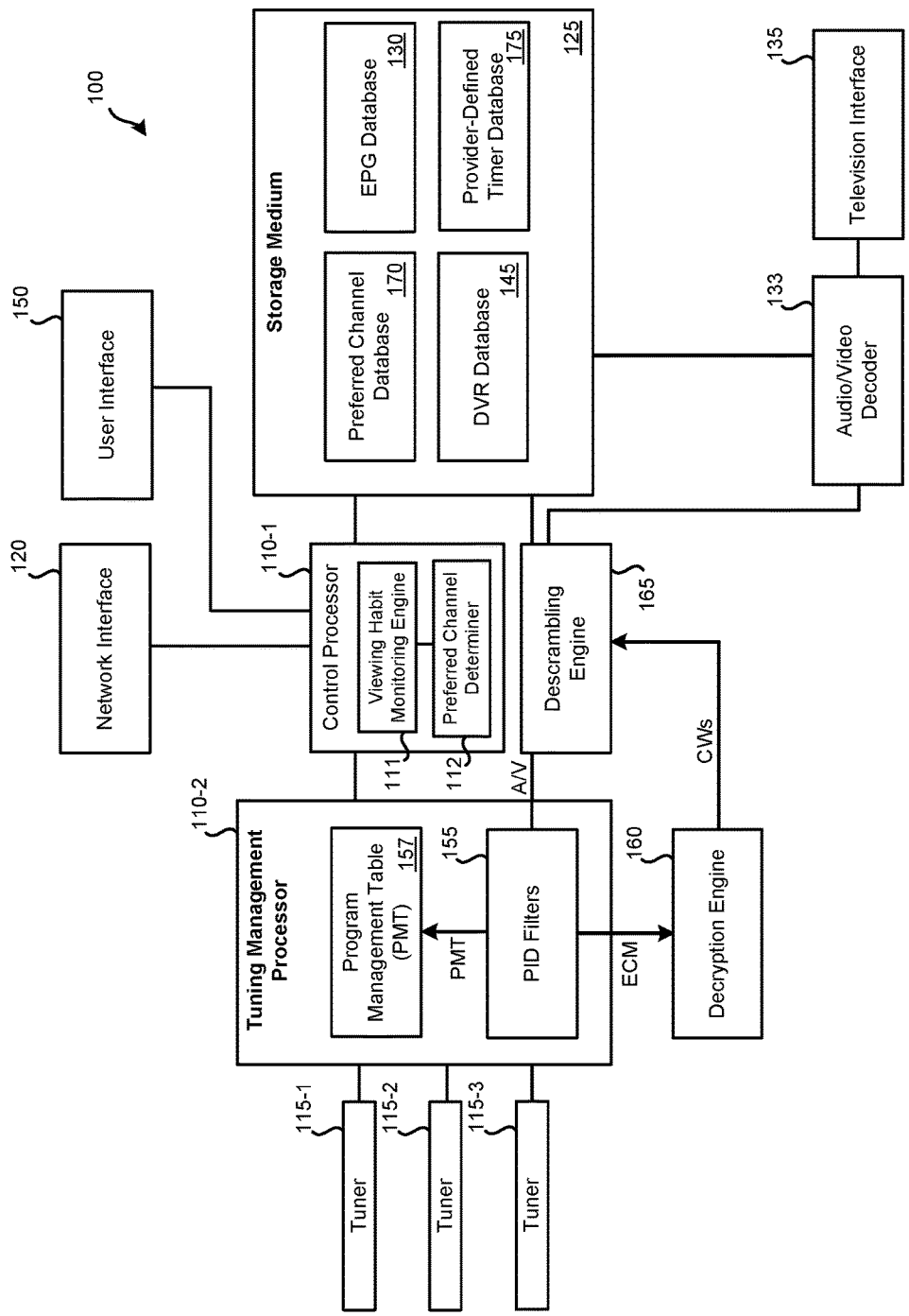
FIG. 1 illustrates an embodiment of a television receiver that monitors the viewing habits of users and determines a preferred television channel list.

FIG. 1 illustrates an embodiment of a television receiver 100 that monitors viewing habits of its users and can provide modified channel surfing modes. Television receiver 100 may function as a video presentation device that outputs video to a television. Embodiments of television receiver 100 may include set top boxes (STBs). In addition to being in the form of an STB, a television receiver may be incorporated as part of another device, such as a television. For example, a television may have an integrated television receiver (which does not involve an external STB being coupled with the television). An STB may contain some or all of the components of television receiver 100 and/or may be able to perform some or all of the functions of television receiver 100.

Television receiver 100 may include: processors 110 (which may include control processor 110-1 and tuning management processor 110-2), tuners 115, network interface 120, non-transitory computer-readable storage medium 125, electronic programming guide (EPG) database 130, television interface 135, digital video recorder (DVR) database 145, PID filters 155, decryption engine 160, descrambling engine 165, preferred channel database 170, and provider-defined timer and reminder database 175. In other embodiments of television receiver 100, fewer or greater numbers of components may be present. It should be understood that the various components of television receiver 100 may be implemented using hardware, firmware, software, and/or some combination thereof. Functionality of components may be combined; for example, functions of descrambling engine 165 may be performed by tuning management processor 110-2. Further, functionality of components may be spread among additional components; for example, PID filters 155 may be handled by separate hardware from program management table (PMT) 157.

Processors 110 may include one or more specialized and/or general-purpose processors configured to perform processes such as tuning to a particular channel, accessing and displaying EPG information, outputting user interfaces, and/or receiving and processing input from a user. For example, processors 110 may include one or more processors dedicated to decoding video signals from a particular format, such as MPEG, for output and display on a television and for performing decryption. It should be understood that the functions performed by various modules of FIG. 1 may be performed using one or more processors. As such, for example, functions of descrambling engine 165 may be performed by control processor 110-1.

Control processor 110-1 may communicate with tuning management processor 110-2. Control processor 110-1 may control the recording of television channels based on timers stored in DVR database 145. Control processor 110-1 may initiate recording of a television channel by sending a record command along with an indication of the television channel to be recorded to tuning management processor 110-2. Control processor 110-1 may not send a second record command (if additional recording is to begin at the same time) until an acknowledgement that recording of the first television channel has successfully been received and initiated by tuning management processor 110-2. Control processor 110-1 may also provide commands to tuning management processor 110-2 when recording of a television channel is to cease. In addition to providing commands relating to the recording of television channels, control processor 110-1 may provide commands to tuning management processor 110-2 that indicate television channels to be output to audio/video decoder 133 for output to a presentation device, such as a television.

Control processor 110-1 may execute various engines to allow for viewing habits to be monitored and a preferred list of television channels to be created and maintained. Viewing habit monitoring engine 111 may monitor usage of the television receiver in one or more respects. Viewing habit monitoring engine 111 may monitor the length of time each television channel is output for presentation on either a lifetime basis or rolling window (e.g., 30 days, 90 days, 365 days, etc.). The viewing habit monitoring engine 111 may additionally or alternatively monitor the number of times a television channel is output for presentation for at least a minimum threshold consecutive period of time (e.g., 5 minutes). The viewing habit monitoring engine 111 may additionally or alternatively monitor the number of television programs recorded from each television channel. One or more than one of these factors may be monitored by viewing habit monitoring engine and used by preferred channel determiner 112 to create or update a preferred listing of television channels stored in preferred channel database 170. For instance, if all three of these factors are used, a simple algorithm to produce the preferred listing of television channels may be to separately rank each television channel according to: (1) the length of time each television channel is output for presentation within a rolling window; (2) the number of times the television channel is output for presentation for at least a minimum threshold consecutive period of time; and (3) the number of television programs recorded on each television channel. The television channels' three ranks could then be averaged together and then the television channels could be ranked in relation to each other based on each channel's averaged rank. It should be understood that the various viewing characteristics that can be monitored by viewing habit monitoring engine 111 can be used to rank television channels in various ways by preferred channel determiner 112.

Viewing habit monitoring engine 111 may monitor viewing habits for the television receiver regardless of the user, time of day, day of week, or week of the year. In other embodiments, the viewing habit monitoring engine 111 may monitor individual users viewing habits (a user may be specified to identify himself when viewing television), on a time basis (e.g., daytime viewing, primetime viewing, late night viewing), day basis (e.g., produce separate viewing habits data for different days of the week [e.g., separate viewership habits for Mondays, Tuesdays, etc.] or for weekdays and weekends), different seasons (e.g., Fall, Spring), different sports seasons (e.g., September through February for football, April through October for baseball, etc.).

The preferred channel determiner can use viewership data for these discrete time periods or discrete users to produce multiple preferred television channel lists that are stored to preferred channel database 170. Different preferred channel lists calculated by preferred channel determiner 112 may be presented at time periods corresponding to when the data was collected by the viewing habit monitoring engine 111. For example, if viewing habit monitoring engine 111 created a set of data for viewing habits pertaining to Mondays, the calculated preferred television channel list may be available for use on Mondays.

In some embodiments, a user or the television service provider indicates a maximum number of preferred television channels to be included in the list of preferred television channels. Preferred channel determiner 112 may then limit the length of the preferred channel list stored by preferred channel database 170 to the defined number.

The list of preferred television channels may be occasionally updated. While viewing habit monitoring engine 111 may continually be gathering data related to content viewing, preferred channel determiner 112 may recalculate the preferred television channel list on a periodic basis (e.g., weekly) or in response to user input requesting the recalculation. (For instance, once a list of preferred television channels has been created, a user may become accustomed to it and may not wish for it to be updated.)

Figure 2:
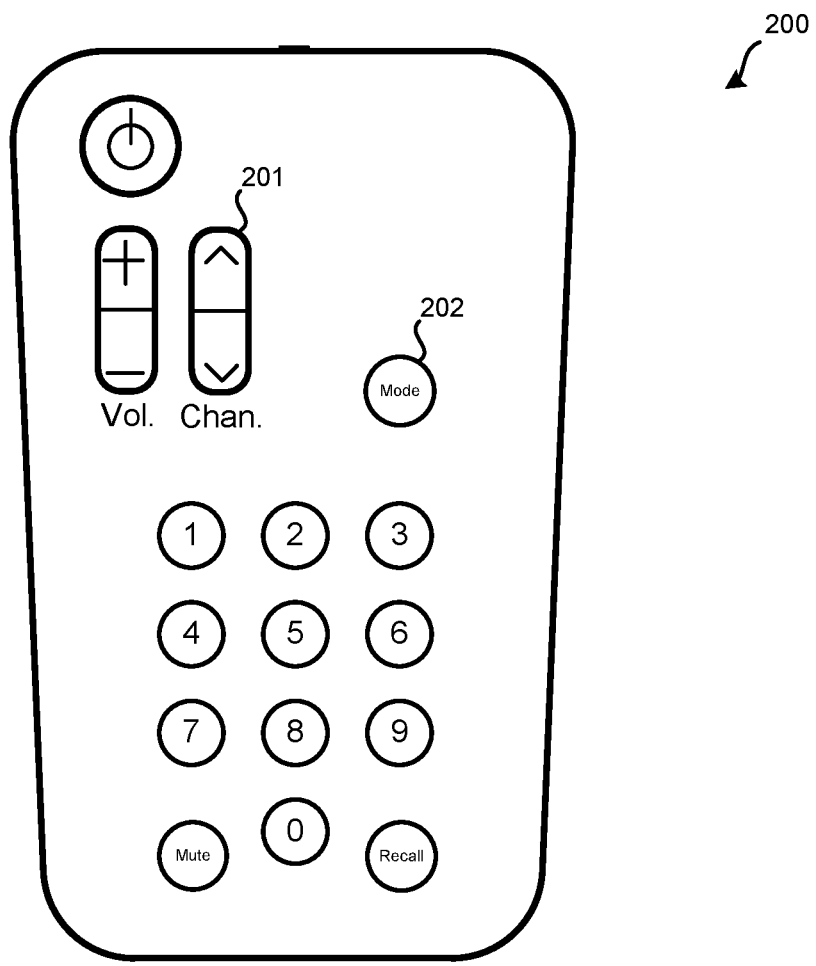
FIG. 2 illustrates an embodiment of a television receiver remote control.

User interface 150 may be a remote control, such as remote control 200 of FIG. 2, that allows for wireless commands to be issued to control processor 110-1 for execution.

Tuners 115 may include one or more tuners used to tune to television channels, such as television channels transmitted via satellite or cable. In the illustrated embodiment of television receiver 100, three tuners are present (tuner 115-1, tuner 115-2, and tuner 115-3). Each tuner contained in tuners 115 may be capable of receiving and processing a single stream of data from a satellite transponder (or a cable RF channel) at a given time. As such, a single tuner may tune to a single transponder (or, for a cable network, a single cable RF channel). If tuners 115 include multiple tuners, one tuner may be used to tune to a television channel on a first transponder stream for display using a television, while another tuner may be used to tune to a television channel on a second transponder for recording and viewing at some other time. Still another tuner may be used to check various television channels to determine if they are available or not, provide additional recording capabilities, or some other service. If multiple television channels transmitted on the same transponder stream are desired, a single tuner of tuners 115 may be used to receive the signal containing the multiple television channels for presentation and/or recording. Tuners 115 may receive commands from tuning management processor 110-2. Such commands may instruct tuners 115 which frequencies are to be used for tuning. Metadata may be received by tuners 115. For instance, a stream of metadata may be transmitted to television receiver 100 along with various pieces of content.

Network interface 120 may be used to communicate via an alternate communication channel with a television service provider, such as to receive metadata. For example, the primary communication channel may be via satellite (which may be unidirectional to the STB) and the alternate communication channel (which may be bidirectional) may be via a network, such as the Internet. Referring back to FIG. 1, television receiver 950 may be able to communicate with television service provider system 910 via a network, such as the Internet. This communication may be bidirectional: data may be transmitted from television receiver 100 to a television service provider system and from the television service provider system to television receiver 100.

Storage medium 125 may represent a non-transitory computer-readable storage medium. Storage medium 125 may include memory and/or a hard drive. Storage medium 125 may be used to store information received from the television service provider via one or more satellites, a cable network, and/or information received via network interface 120. Recorded television programs may be stored using storage medium 125 in DVR database 145, EPG data may be stored to EPG database 130. Storage medium 125 may be partitioned or otherwise divided such that predefined amounts of storage medium 125 are devoted to storage of omnibus channel files and user-selected television programs.

Preferred channel database 170 may be a database stored on storage medium 125. Preferred channel database 170 may include one or more preferred channel listings. If more than one list is stored, each list may be mapped to a condition that is associated with when the preferred listing is active. For example, if a preferred channel listing is mapped to baseball season, it may be stored in association with data that indicates the preferred television channel listing is only to be presented during April through October.

Provider-defined timer and reminder database 175 can store data indicative of reminders and timers for popular television programs on various (e.g., some, all) television channels. Therefore, different reminders and timers may be received for each television channel including television channels that are not currently part of a stored preferred channel listing. For timers, timers received and stored to provider-defined timer and reminder database 175 may indicate time periods on television channels that encompass more than a single television program. For instance, the time period may encompass all primetime television for a given day on a television channel by being from 7-10 PM.

Audio/video decoder 133 may serve to convert encoded video and audio into a format suitable for output to a display device. For instance, audio/video decoder 133 may receive MPEG video and audio from storage medium 125 or descrambling engine 165 to be output to a television. MPEG video and audio from storage medium 124 may have been recorded to DVR database 145 as part of a previously-recorded television program. Audio/video decoder 133 may convert the MPEG video and audio into a format appropriate to be displayed by a television or other form of display device and audio into a format appropriate to be output from speakers, respectively.

Television interface 135 may serve to output a signal to a television (or another form of display device) in a proper format for display of video and playback of audio. As such, television interface 135 may output one or more television channels, stored television programming from storage medium 125 (e.g., television programs from DVR database 145) to a television for presentation.

DVR functionality of television receiver 100 may be managed by control processor 110-1. Control processor 110-1 may coordinate the television channel, start time, and stop time of when recording of a television channel is to occur. DVR database 145 may store information related to the recording of television stations. DVR database 145 or some other storage arrangement (e.g., a separate file) may store timers that are used by control processor 110-1 to determine when a television channel should be tuned to and its programs recorded to DVR database 145 of storage medium 125. In some embodiments, a limited amount of storage medium 125 may be devoted to DVR database 145. Timers may be set by the television service provider and/or one or more users of television receiver 100.

The DVR functionality of control processor 110-1 may have multiple modes. First, the DVR functionality of control processor 110-1 may be configured to record individual television programs selected by a user to DVR database 145. Based on the date, time period, and television channel indicated by EPG data, control processor 110-1 may record the associated television program to DVR database 145. Second, DVR database 145 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by the television service provider.

As an example of this second mode of DVR functionality, a television service provider may configure television receiver 100 to record television programming on multiple, predefined television channels for a predefined period of time, on predefined dates. For instance, a television service provider may configure television receiver 100 such that television programming may be recorded from 7 PM to 10 PM on NBC, ABC, CBS, and FOX on each weeknight. If a television program is selected for recording by a user (e.g., the user sets a recording timer for the television program) and is also specified for recording by the television service provider, the user selection for recording may serve as an indication to save the television program for an extended time (beyond the time which the predefined recording would otherwise be saved).

Referring back to tuners 115, television channels received via satellite (or cable) may contain at least some scrambled data. Packets of audio and video may be scrambled to prevent unauthorized users (e.g., nonsubscribers) from receiving television programming without paying the television service provider. When a tuner of tuners 115 is receiving data from a particular transponder of a satellite, the transponder stream may be a series of data packets corresponding to multiple television channels. Each data packet may contain a packet identifier (PID), which, in combination with a network information table and/or PMT 157, can be determined to be associated with a particular television channel. Particular data packets, referred to as entitlement control messages (ECMs), may be periodically transmitted. ECMs may be associated with another PID and may be encrypted; television receiver 100 may use decryption engine 160 (which may be a removable or non-removable smartcard) to decrypt ECMs. Decryption of an ECM may only be possible if the user has authorization to access the particular television channel associated with the ECM. When an ECM is determined to correspond to a television channel being stored and/or displayed, the ECM may be provided to decryption engine 160 for decryption.

When decryption engine 160 receives an encrypted ECM, decryption engine 160 may decrypt the ECM to obtain some number of control words. In some embodiments, from each ECM received by decryption engine 160, two control words are obtained. In some embodiments, when decryption engine 160 receives an ECM, it compares the ECM to the previously received ECM. If the two ECMs match, the second ECM is not decrypted because the same control words would be obtained. In other embodiments, each ECM received by decryption engine 160 is decrypted; however, if a second ECM matches a first ECM, the outputted control words will match; thus, effectively, the second ECM does not affect the control words output by decryption engine 160. Decryption engine 160 may be permanently part of television receiver 100 or may be configured to be inserted and removed from television receiver 100.

Tuning management processor 110-2 may be in communication with tuners 115 and control processor 110-1. Tuning management processor 110-2 may be configured to receive commands from control processor 110-1. Such commands may indicate when to start/stop recording a television channel and/or when to start/stop causing a television channel to be output to a television. Tuning management processor 110-2 may control tuners 115. Tuning management processor 110-2 may provide commands to tuners 115 that instruct the tuners which satellite, transponder, and/or frequency to tune to. From tuners 115, tuning management processor 110-2 may receive transponder streams of packetized data. As previously detailed, some or all of these packets may include a PID that identifies the content of the packet.

Tuning management processor 110-2 may be configured to create one or more PID filters 155 that sort packets received from tuners 115 based on the PIDs. When a tuner is initially tuned to a particular frequency (e.g., to a particular transponder of a satellite) a PID filter may be created based on a PID of PMT data.

PID filters 155 may be configured to filter data packets based on PIDs. In some embodiments, PID filters 155 are created and executed by tuning management processor 110-2. In other embodiments, separate hardware may be used to create and execute such PID filters. Depending on a television channel selected for recording/viewing, a PID filter may be created to filter the video and audio packets associated with the television channel (based on the PID assignments present in PMT 157). For example, if a transponder data stream includes multiple television channels, data packets corresponding to a television channel, that is not desired to be stored or displayed by the user, may be ignored by PID filters 155. As such, only data packets corresponding to the one or more television channels desired to be stored and/or displayed may be filtered and passed to either descrambling engine 165 or decryption engine 160; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as metadata, may be appropriately routed by PID filters 155. At a given time, one or multiple PID filters may be executed by tuning management processor 110-2.

Descrambling engine 165 may use the control words output by decryption engine 160 in order to descramble video and/or audio corresponding to television channels for storage and/or presentation. Video and/or audio data contained in the transponder data stream received by tuners 115 may be scrambled. Video and/or audio data may be descrambled by descrambling engine 165 using a particular control word. Which control word output by decryption engine 160 to be used for successful descrambling may be indicated by a scramble control identifier present within the data packet containing the scrambled video or audio. Descrambled video and/or audio may be output by descrambling engine 165 to storage medium 125 for storage (in DVR database 145) and/or to audio/video decoder 133 for output to a television or other presentation equipment via television interface 135.

For simplicity, television receiver 100 of FIG. 1 has been reduced to a block diagram; commonly known parts, such as a power supply, have been omitted. Further, some routing between the various modules of television receiver 100 has been illustrated. Such illustrations are for exemplary purposes only. The state of two modules not being directly or indirectly connected does not indicate the modules cannot communicate. Rather, connections between modules of the television receiver 100 are intended only to indicate possible common data routing. It should be understood that the modules of television receiver 100 may be combined into a fewer number of modules or divided into a greater number of modules. Further, the components of television receiver 100 may be part of another device, such as built into a television. Also, while television receiver 100 may be used to receive, store, and present television channels received via a satellite, it should be understood that similar components may be used to receive, store, and present television channels via a cable network.

FIG. 2 illustrates an embodiment of a television receiver remote control 200. Remote control 200 may have dedicated channel change buttons 201. Dedicated channel change buttons 201, when depressed, may typically cause the remote control to issue a command that causes the currently output television channel number to increment or decrement by one. Remote control 200 may have a button that allows for a channel surfing mode to be switched. Mode button 202, when pushed, causes remote control 200 to transmit a command to a television receiver (such as television receiver 100 of FIG. 1) to change a surfing mode to enter or exit a preferred television channel mode. In some embodiments, two modes are available: preferred television channel mode and increment channel change mode. When mode button 202 is pushed, the television receiver switches between preferred television channel mode and incremental channel change mode. In some embodiments, additional channel change modes are available.

When the television receiver has been set to the preferred television channel mode, the channel changes commands issued from dedicated channel change buttons 201 may cause the television receiver to increment or decrement the channel output for presentation based on the preferred television channel listing stored by the television receiver. This preferred television channel listing may not be in numerical order but may rather be arranged based on an order determined by preferred channel determiner 112. When the television receiver is set to incremental channel change mode, change channel commands issued by the remote control based on dedicated channel change buttons 201 being pressed may increment or decrement the television channel number being output for presentation by the television receiver by one (or to the channel number of a television channel that is next available).

While in some embodiments, the commands issued by dedicated channel change buttons 201 do not change regardless of the mode and the television receiver determines how the channel up or channel down command should be interpreted, in other embodiments the preferred channel listing is enforced by the remote control. In such embodiments, the television receiver may transmit the preferred television channel list to remote control 200. Remote control 200 would store the preferred television channel list. When remote control 200 is set to the preferred television channel change mode and receives a channel up or channel down command via dedicated channel change buttons 201, the remote control would issue a command to the television receiver that specifies the specific channel number to output for presentation based on the remote control's stored preferred channel listing. Such an arrangement can permit remote control 200 to be used at multiple television receivers and use the preferred television channel listing for channel navigation at each of the multiple television receivers.

Figure 3:
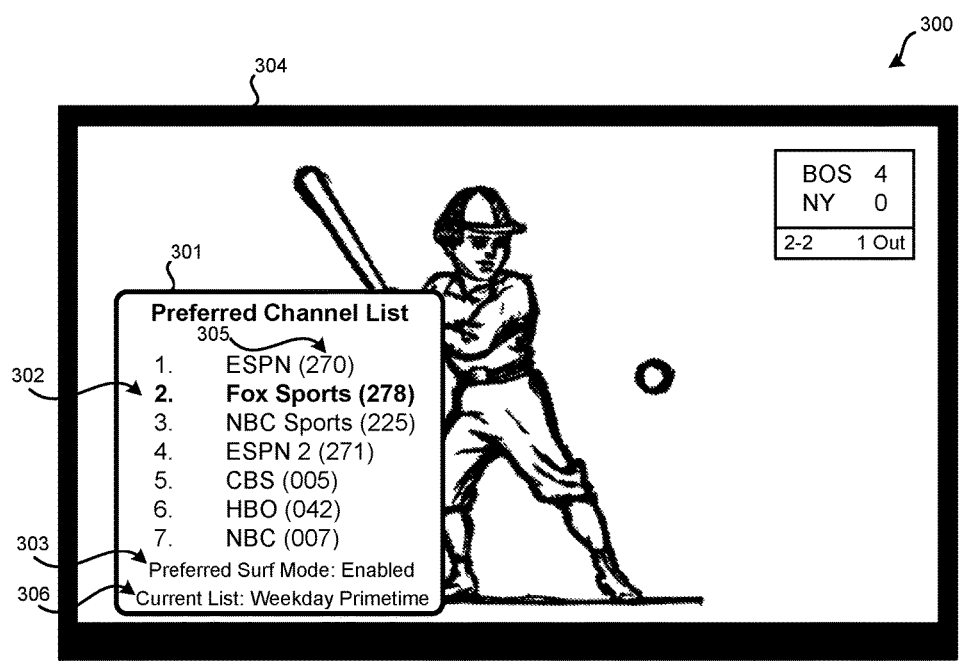
FIG. 3 illustrates an embodiment of an on-screen presentation of the preferred television channel list.

FIG. 3 illustrates an embodiment 300 of an on-screen presentation of the preferred television channel list. Embodiment 300 represents a preferred channel list 301 that may be overlaid a television channel's content being output for presentation on display device 304 (e.g., a television). Preferred channel list 301 may be presented in response to the preferred channel change mode being made active at the television receiver and may be displayed for a predefined period of time (e.g., 5 seconds). In other embodiments, preferred channel list 301 may only be presented in response to user input requesting presentation of preferred channel list 301.

Preferred channel list 301 may present a ranking 302 of television channels that are present on the preferred television channel list. For each television channel, a name of the television channel and/or a channel number 305 may be listed. If the television channel being output for presentation is a television channel on the preferred channel list 301, the currently output television channel may be emphasized. An indication 303 may be output by the television receiver that indicates whether or not the preferred channel surf mode is active.

In the illustrated example, when a channel up is received from a remote control via dedicated channel change buttons 201 while the preferred channel change mode is active, it may cause the television receiver to switch from channel 278 to channel 270 based upon the channels' positions in the preferred channel list. Again in this illustrated example, when a channel down command is received from a remote control via dedicated channel change buttons 201 while the preferred channel change mode is active, it may cause the television receiver to switch from channel 278 to channel 225 based upon the channels' positions in the preferred channel list.

In some embodiments, a user may navigate using preferred channel list 301 by navigating through the list using navigation commands and select a particular television channel to output for presentation. Such an arrangement may allow a user to skip one or more channels on the preferred channel list rather than using the channel up and channel down commands to navigate through channels on the list consecutively. In some embodiments, a user may manually rearrange channels on the list by selecting the channel and repositioning within the list or removing the channel from the list altogether. Similarly, the user may add a channel to the preferred listing manually (that is, not based on the channel being identified as preferred based on viewing statistics but on the user's desire for the channel to be included in the list). In some embodiments, such as if multiple preferred channel listings are stored by the television receiver, indicator 306 may be output for presentation by the television receiver and may indicate the particular preferred channel list that is active and being presented.

Figure 4:
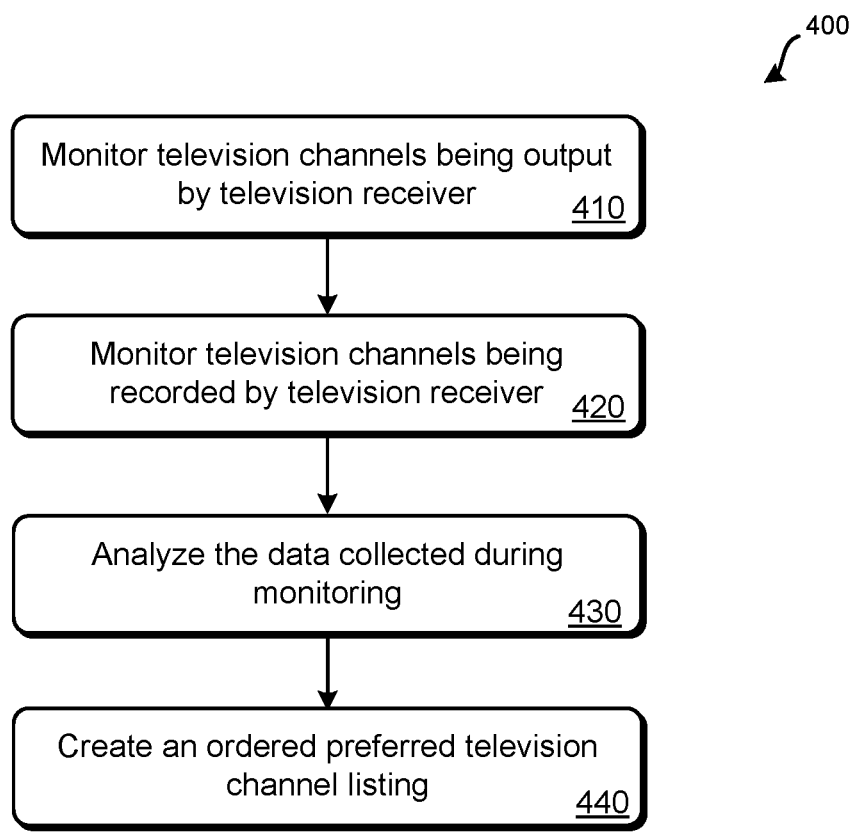
FIG. 4 illustrates an embodiment of a method for creating a preferred television channel list.

The systems, devices, and interfaces of FIGS. 1-3 may be used to perform various methods. FIG. 4 illustrates an embodiment of a method 400 for creating a preferred television channel list. Each block of method 400 may be performed by a television receiver, such as television receiver 100 of FIG. 1.

At block 410, the television receiver may monitor television channels that are output for presentation. Additionally or alternatively, the television receiver may store an indication of each time that a television channel is output for presentation for at least a threshold period of time (e.g., 3 minutes, 5 minutes, 10 minutes). Additionally or alternatively, the television receiver may store an indication of from which television channels programming is recorded at block 420. As previously detailed, some or all of these viewing characteristics may be monitored by the television receiver and given various weights (that is, a television channel being output live may be given a higher weight than recording a television program from the television channel). In some embodiments, additional data that can be used to group various viewing data may be monitored and stored along with which television channel is being output or recorded, such as which user is using the television receiver, the time of day, the day of week, the season of the year, etc. The data at blocks 410 and 420 may be collected within a rolling window such that older data eventually ages out and does not affect the creation of a preferred television channel list. For example, the rolling window may be 30, 60, or 90 days in duration; in other embodiments, the rolling window may be 180 days or 365 days in duration. Other durations for the rolling window, both longer and shorter, are also possible. The length of this window may be defined by the television service provider or by a user of the television receiver.

At block 430, the monitoring data collected at block 410 and/or block 420 may be analyzed by the television receiver. More specifically, a preferred channel determiner executed by a control processor of the television receiver may analyze the data using a stored algorithm. This stored algorithm may have different weights assigned to each category of data collected at blocks 410 and 420. For example, the algorithm may calculate a rank for each television channel for which data was collected at blocks 410 and 420. Each of these ranks may then be multiplied by a category weight, and then the ranks for a given television channel may be averaged together. These averaged ranks may then be used to rank the television channels against each other. The television channels with the lowest ranks (indicating a higher desirability) may be included in the preferred television channel listing created at block 440 based on the analyzed data of block 430. The number of television channels included in the preferred television channel listing may be set by the television service provider, based on input from a user of the television receiver, or may be based on the number of television channels that reach a threshold duration of viewing time, threshold number of views above a minimum amount of time, and/or a threshold number of recording events.

Method 400 may be periodically or occasionally repeated to update the preferred list of television channels. In some embodiments, blocks 410 and 420 are performed whenever the television receiver is in use; however, blocks 430 and 440 may be performed upon request by a user to update the preferred television channel listing. In some embodiments, the television service provider may transmit a message to the television receiver triggering the preferred television channel list to be updated.

Figure 5:
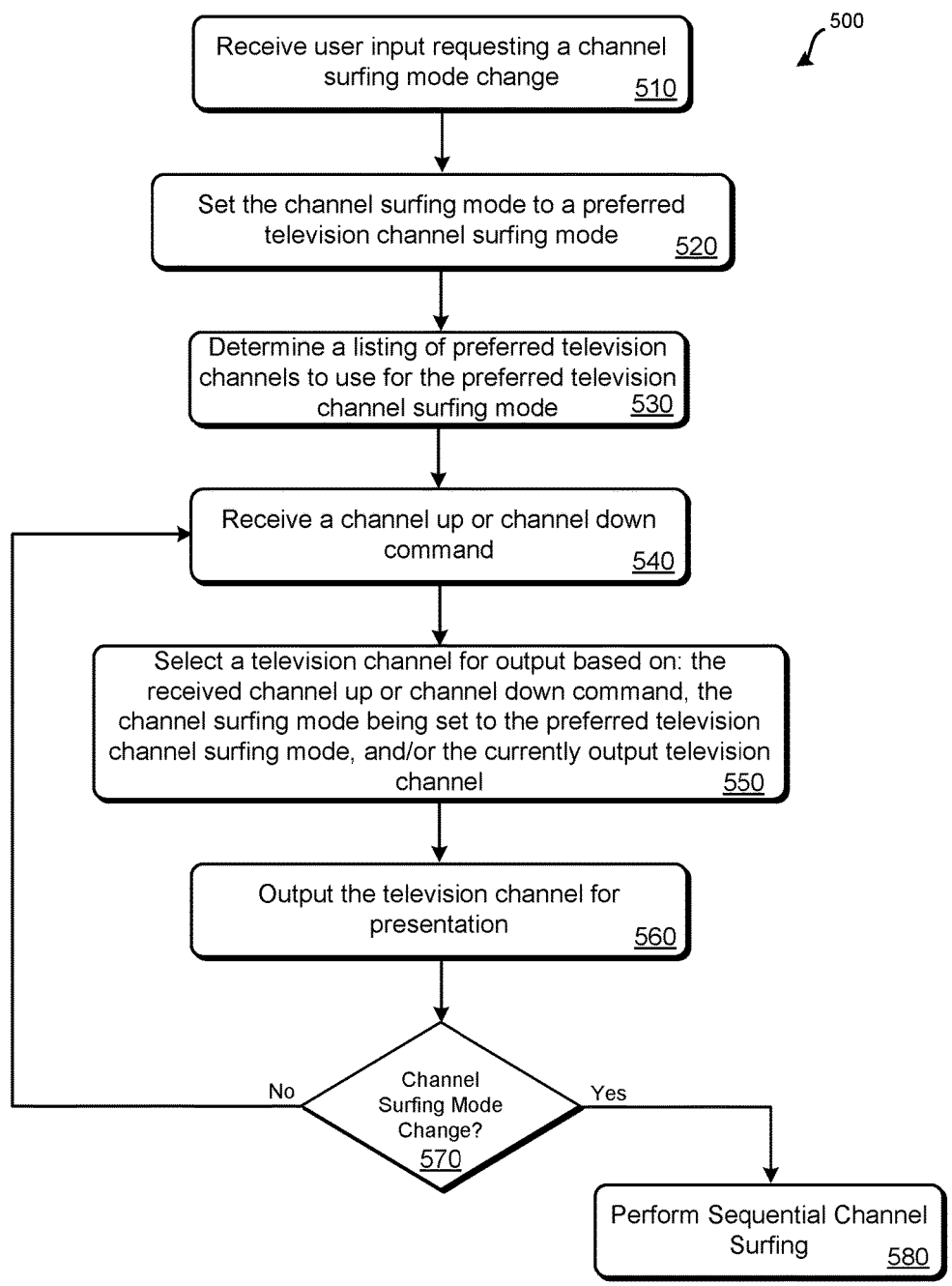
FIG. 5 illustrates an embodiment of a method for using the preferred television channel list for channel surfing.

FIG. 5 illustrates an embodiment of a method 500 for using the preferred television channel list for channel surfing. Each block of method 500 may be performed by a television receiver, such as television receiver 100 of FIG. 1. Method 500 may be performed after method 400 has been performed at least once such that a preferred channel listing is stored by the television receiver.

At block 510, user input requesting a channel surfing mode change may be received. The user input received at block 510 may be a user pressing a surfing mode change button on a remote control such as mode button 202 of remote control 200 or selecting such an option from a displayed menu. Pressing of such a button or selection of such a menu option may trigger a channel surfing mode change to be transmitted to the television receiver. At block 520, in response to the command of block 510, the television receiver may set a channel surfing mode to a preferred television channel surfing mode from some other surfing mode, such as a conventional incremental channel surfing mode. By the channel surfing mode being set to the preferred television channel surfing mode, the dedicated channel up and channel down buttons of the remote control have effectively been repurposed to allow for a modified form of channel surfing.

At block 530, a listing of preferred television channels to use for the preferred television channel surfing mode may be determined. If only one listing of preferred television channels is stored by the television receiver, at block 530 this list may be loaded from a storage medium, such as by loading the listing from preferred channel database 170 of storage medium 125 of television receiver 100. In other embodiments, multiple preferred television channel listings may be stored by the television receiver. The current time of day, day of week, season of the year, and user may be factors used to select a particular listing of preferred television channels at block 530. For example, if it is Friday when block 530 is performed, a listing of preferred television channels specific to Fridays may be determined to be loaded. Therefore, at block 530, the television receiver may access the current time, date, day of week, season of year, and/or a profile of the current user to select a listing of preferred television channels that are mapped to ranges of time, days, days of the week, seasons of the year, and/or user.

At block 540, while in the preferred television channel surfing, a channel up or channel down command may be received from a remote control using a dedicated channel up or dedicated channel down button. At block 550, a television channel may be selected for output. Television channels selected for output may be selected based on: (1) the preferred television channel surfing mode being active; (2) the television channel being listed on the preferred television channel list; and (3) the channel up or channel down command being received. Which television channel is selected for output from the list may vary by embodiment: in some embodiments, if the channel up or channel down command of block 540 is the first channel change command received since the channel surfing mode has been set to the preferred television channel surfing mode at block 520, the channel up or channel down command may cause the television receiver to tune to the highest ranked (first) television channel on the preferred television channel listing.

In some embodiments, if the channel up or channel down command of block 540 is the first channel change command received since the channel surfing mode has been set to the preferred television channel surfing mode at block 520, the channel up or channel down command may cause the television receiver to tune to the numerically closest (either greater or lesser, based on whether the command is a channel up or channel down command) channel number that appears in the preferred channel listing from a currently output television channel. For example, referring to FIG. 3, if the current channel being output is 120 and a channel up command is received, the television receiver would output channel 225 because it is the next highest television channel number that appears on the preferred television channel listing. In some embodiments, if the channel up or channel down command of block 540 is the first channel change command received since the channel surfing mode has been set to the preferred television channel surfing mode at block 520 and the currently output television channel is already set to a television channel appearing in the preferred television channel listing, the television channel may be changed in accordance with the order of the preferred television channel list.

For subsequent television channel changes after the first while the television receiver is in the preferred television channel surfing mode and a channel up or channel down command is received, the channel change order may be based on the ordering of the preferred television channel list. Therefore, such changes may be numerically out of order but in order of viewer preference as determined in accordance with method 400. Such a list is exemplified in embodiment 300 of FIG. 3. For example, if a subsequent channel down command is received by the television receiver while the television receiver is set to the preferred television channel surfing mode of block 520 and is set to preferred channel 3 (NBC Sports—channel 225), the channel down command would result in preferred channel 4 (ESPN 2—channel 271) being selected and output for presentation.

At block 560, the television receiver outputs the television channel selected at block 550 to a display or presentation device, such as a television for presentation. In some embodiments, the preferred channel list, such as preferred channel list 301 of FIG. 3 may be presented for a period of time in response to block 520, block 540, and/or block 560. In other embodiments, the preferred channel list 301 is only presented upon request by a user.

At block 570, if the channel surfing mode is changed back to incremental channel surfing, method 500 may proceed to block 580 at which channel up and channel down commands issued using dedicated buttons on a remote control result in the channel number being output for presentation being incremented up or down, respectively, by one (or to the next available television channel if the numerically next television channel is not available). At block 570, if the channel surfing mode is maintained in the preferred television channel surfing mode, channel up and channel down commands issued using such dedicated buttons on the remote control navigate through the preferred television channel list as previously described.

Figure 6:
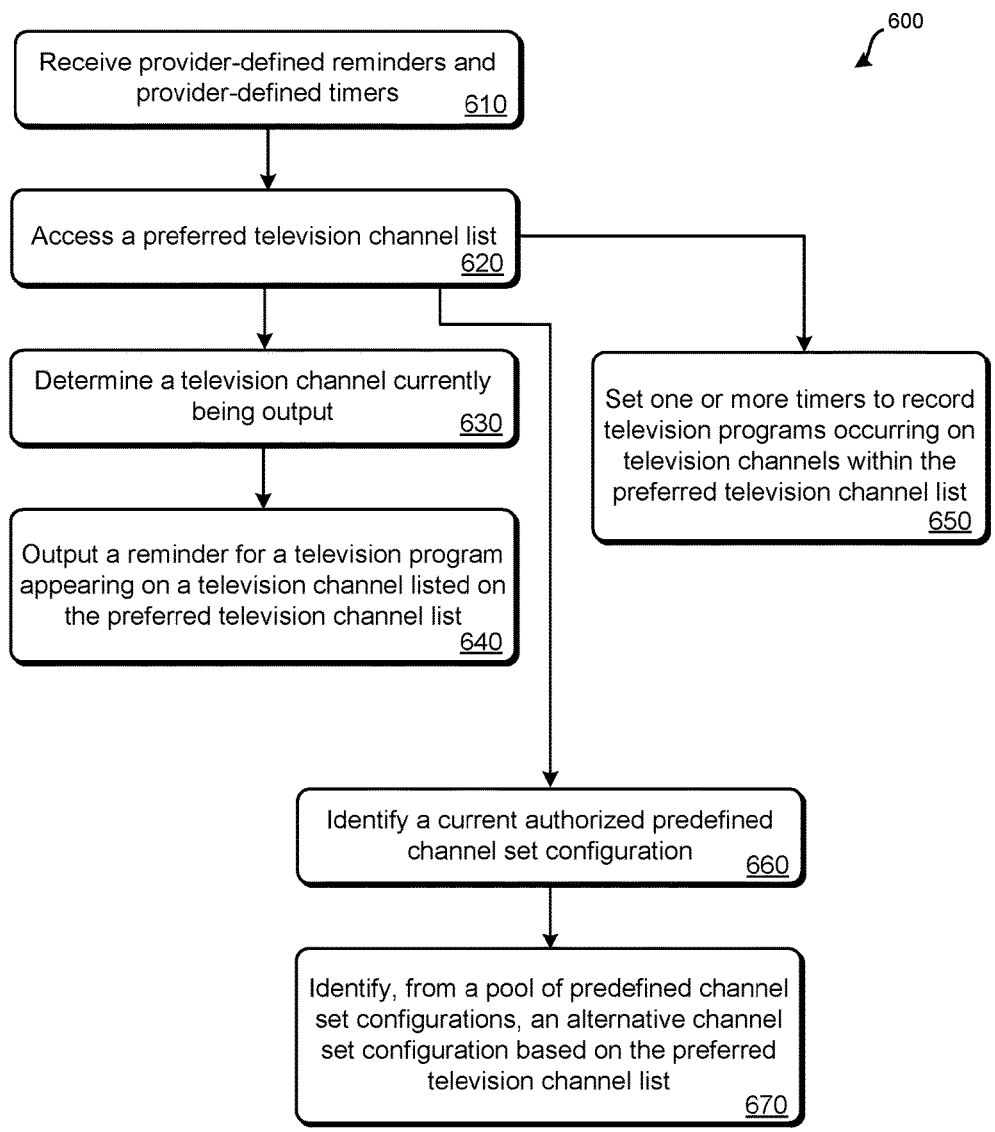
FIG. 6 illustrates an embodiment of a method for using the preferred television channel list for issuing viewing reminders, setting record timers, and suggesting alternate predefined channel set configurations.

FIG. 6 illustrates an embodiment of a method 600 for using the preferred television channel list for issuing viewing reminders, setting record timers, and suggesting alternate predefined channel set configurations. Each block of method 600 may be performed by a television receiver, such as television receiver 100 of FIG. 1. Method 600 may be performed after method 400 has been performed at least once such that a preferred channel listing is stored by the television receiver. In method 600, the one or more preferred channel listings stored by the television receiver are used to provide additional services to television viewers, including reminders, automatically recorded television programs, and recommended predefined channel set configurations.

At block 610, provider defined reminders and provider defined timers may be received by the television receiver. Such reminders and timers may be received for various popular television programs appearing on some or all of the television channels that the television receiver receives (irrespective of the locally-maintained preferred channel list). These reminders and timers may be stored to provider defined timer and reminder database 175.

At block 620, a preferred television channel list, which may have been created in accordance with method 400 of FIG. 4, may be accessed that identifies preferred channels at the specific television receiver. At block 630, the current television channel being output for presentation may be determined.

At block 640, a provider defined reminder for a television program appearing on a television channel that is listed in the locally maintained preferred television channel list may be output for presentation. This reminder may only be presented if it is for a television program appearing on a television channel that is: (1) not currently being output; and (2) for a television channel listed within the preferred television channel list.

Additionally or alternatively, block 650 may be performed at part of method 600. At block 650, one or more timers to record one or more television programs in accordance with the one or more received provider defined timers may be set. Such timers may only be set for television programs broadcast on television channels listed in the locally maintained preferred television channel list. Therefore, if this feature is enabled, a user may have access to recordings of popular television programming that occur on the preferred television channels identified at the television receiver. Such an arrangement allows for which television programs are automatically recorded at a television receiver to be customized based on local viewing preferences and popularity determined by the television service provider.

Additionally or alternatively, blocks 660 and 670 may be performed. At block 660, a current authorized predefined channel set configuration may be identified. These channels may be television channels that the television receiver is authorized to descramble and output for presentation. At block 670, in alternative channel set configuration may be identified from a pool of predefined channel set configurations based on the locally maintained preferred television channel list. This alternative channel set configuration may include additional television channels that carry similar content to the television channels appearing in the preferred television channel list. For example, if television channels are present in the preferred television channel list that tend to carry sports programming, the alternative channel set configuration recommended may include additional sportfocused channels and/or sister channels to the television channel in the preferred television channel list (e.g., ESPN, ESPN2, ESPN3, etc.). Alternatively, the alternate channel set configuration may include all of the preferred television channels from the preferred television channel list but include fewer other channels that appear to not be preferred by users of the television receiver. Such an arrangement may allow a user of the television receiver to downgrade a channel package while still receiving all of his preferred television channels.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for modified channel surfing, comprising:
   monitoring, by a television receiver, viewing habits of users of the television receiver during a rolling time window;
   determining, by the television receiver, a preferred television channel list indicating a plurality of preferred television channels based on the monitored viewing habits of users of the television receiver during the rolling time window;
   receiving, by the television receiver via a remote control, user input requesting a channel surfing mode change to a preferred television channel mode;
   setting, by the television receiver, the channel surfing mode to the preferred television channel mode; receiving, by the television receiver, via the remote control, a channel up command or channel down command, wherein the channel up command is based on a user pressing a designated channel up button or a designated channel down button on the remote control;
   selecting, by the television receiver, a first television channel selected from the preferred television channel list in response to: the channel up command or channel down command; and the television receiver being set to the preferred television channel mode;
   outputting, by the television receiver, the first television channel for presentation,
   receiving, by the television receiver, data indicative of a popular television program on a second television channel of the preferred television channel list from a television service provider, and
   outputting, by the television receiver, for presentation a reminder based on the data indicative of the popular television program based on: the television receiver not currently outputting the second television channel and the second television channel being part of the preferred television channel list.

2. The method for modified channel surfing of claim 1, wherein the monitored viewing habits of the users of the television receiver indicate an incidence count of a plurality of television channels being output for at least a threshold period of time.

3. The method for modified channel surfing of claim 1, wherein the monitored viewing habits of the users of the television receiver indicate a total time duration of each of a plurality of television channels being output within a rolling time window.

4. The method for modified channel surfing of claim 1, further comprising:
   prior to outputting the first television channel, selecting, by the television receiver, the first television channel from the preferred television channel list based on the first television channel being the highest ranked television channel on the preferred television channel list.

5. The method for modified channel surfing of claim 4, further comprising:
   while outputting the first television channel from the preferred television channel list, receiving, by the television receiver, via the remote control, a second channel up command or a second channel down command, wherein the second channel up command or the second channel down command is based on the user pressing the designated channel up button or the designated channel down button on the remote control;
   selecting, by the television receiver, a second television channel from the preferred television channel list based on the second television channel being the next ranked television channel on the preferred television channel list from the first television channel; and
   outputting, by the television receiver, the second television channel selected from the preferred television channel list in response to the channel up command or channel down command and the television receiver being set to the preferred television channel mode.

6. The method for modified channel surfing of claim 1, further comprising:
  prior to outputting the first television channel, selecting, by the television receiver, the first television channel from the preferred television channel list based on the first television channel being numerically a next channel on the preferred television channel list from a currently-output television channel.

7. The method for modified channel surfing of claim 1, further comprising:
  receiving, by the television receiver, user input requesting the channel surfing mode change from the preferred television channel mode to an incremental channel change mode;
  setting, by the television receiver, the channel surfing mode to the incremental television channel mode;
  receiving, by the television receiver, via the remote control, a second channel up command, wherein the channel up command is based on the user pressing the designated channel up button on the remote control; and
  outputting, by the television receiver, for presentation, a second television channel based on: the second television channel being a numerically next greater television channel from a previously-tuned television channel; the second channel up command; and the television receiver being set to the incremental channel change mode.

8. The method for modified channel surfing of claim 1, further comprising:
  in response to setting the channel surfing mode to the preferred television channel mode, outputting, by the television receiver, for presentation the preferred television channel list as an overlay over television programming being output by the television receiver.

9. The method for modified channel surfing of claim 1, further comprising: recommending, by the television receiver, a predefined channel set configuration from a plurality of predefined channel set configurations based on the preferred television channel list, wherein the predefined channel set configuration comprises the plurality of preferred television channels.

10. A method for modified channel surfing of claim 1, further comprising:
  monitoring, by a television receiver, viewing habits of users of the television receiver during a rolling time window;
  determining, by the television receiver, a preferred television channel list indicating a plurality of preferred television channels based on the monitored viewing habits of users of the television receiver during the rolling time window;
  receiving, by the television receiver via a remote control, user input requesting a channel surfing mode change to a preferred television channel mode;
  setting, by the television receiver, the channel surfing mode to the preferred television channel mode;
  receiving, by the television receiver, via the remote control, a channel up command or channel down command, wherein the channel up command is based on a user pressing a designated channel up button or a designated channel down button on the remote control;
  selecting, by the television receiver, a first television channel selected from the preferred television channel list in response to: the channel up command or channel down command; and the television receiver being set to the preferred television channel mode;
  outputting, by the television receiver, the first television channel for presentation;
  receiving, by the television receiver, a timer for a second television channel of the preferred television channel list from a television service provider; and
  recording the second television channel for a period of time based on the timer received from the television service provider and the second television channel being listed on the preferred television channel list.

11. A television receiver system for modified channel surfing, comprising:
  a remote control comprising a channel up button and a channel down button; and
  a television receiver, comprising:
    one or more processors; and
    a memory communicatively coupled with and readable by the one or more processors and having stored therein processor-readable instructions which, when executed by the one or more processors, cause the one or more processors to:
      monitor viewing habits of users of the television receiver during a rolling time window;
      determine a preferred television channel list indicating a plurality of preferred television channels based on the monitored viewing habits of users of the television receiver during the rolling time window;
      receive, from the remote control, user input requesting a channel surfing mode change to a preferred television channel mode;
      set the channel surfing mode to the preferred television channel mode;
      receive, from the remote control, a channel up command or channel down command;
      select a first television channel selected from the preferred television channel list in response to: the channel up command or channel down command; and the television receiver being set to the preferred television channel mode;
      output the first television channel for presentation;
      receive data indicative of a popular television program on a second television channel of the preferred television channel list from a television service provider; and
      output for presentation a reminder based on the data indicative of the popular television program based on: the television receiver not currently outputting the second television channel and the second television channel being part of the preferred television channel list.

12. The television receiver system of claim 11, wherein the television receiver monitoring the viewing habits comprises the television receiver creating data that indicates an incidence count of a plurality of television channels being output for at least a threshold period of time.

13. The television receiver system of claim 11, wherein the television receiver monitoring the viewing habits comprises the television receiver creating data that indicates a total time duration of each of a plurality of television channels being output within a rolling time window.

14. The television receiver system of claim 11, wherein the processor-readable instructions, when executed by the one or more processors of the television receiver, further cause the one or more processors to:
  prior to outputting the first television channel, select the first television channel from the preferred television channel list based on the first television channel being the highest ranked television channel on the preferred television channel list.

15. The television receiver system of claim 14, wherein the processor-readable instructions, when executed by the one or more processors of the television receiver, further cause the one or more processors to:
    while outputting the first television channel from the preferred television channel list, receive, from the remote control, a second channel up command or a second channel down command, wherein the second channel up command or the second channel down command is based on the channel up button or the channel down button being pressed on the remote control;
    select a second television channel from the preferred television channel list based on the second television channel being the next ranked television channel on the preferred television channel list from the first television channel; and
    output the second television channel selected from the preferred television channel list in response to the channel up command or channel down command and the television receiver being set to the preferred television channel mode.

16. The television receiver system of claim 11, wherein the processor-readable instructions, when executed by the one or more processors of the television receiver, further cause the one or more processors to:
    receive user input requesting the channel surfing mode change from the preferred television channel mode to an incremental channel change mode;
    set the channel surfing mode to the incremental television channel mode;
    receive, via the remote control, a second channel up command, wherein the channel up command is based on the channel up button on the remote control being pressed; and
    output, for presentation, a second television channel based on: the second television channel being a numerically next greater television channel from a previously-tuned television channel; the second channel up command; and the television receiver being set to the incremental channel change mode.

17. The television receiver system of claim 11, wherein the processor-readable instructions, when executed by the one or more processors of the television receiver, further cause the one or more processors to: recommend a predefined channel set configuration from a plurality of predefined channel set configurations based on the preferred television channel list, wherein the predefined channel set configuration comprises the plurality of preferred television channels.

18. A television receiver system, comprising:
    a remote control comprising a channel up button and a channel down button; and
    a television receiver, comprising:
    one or more processors; and
    a memory communicatively coupled with and readable by the one or more processors and having stored therein processor-readable instructions which, when executed by the one or more processors, cause the one or more processors to:
    monitor viewing habits of users of the television receiver during a rolling time window;
    determine a preferred television channel list indicating a plurality of preferred television channels based on the monitored viewing habits of users of the television receiver during the rolling time window;
    receive, from the remote control, user input requesting a channel surfing mode change to a preferred television channel mode;
    set the channel surfing mode to the preferred television channel mode;
    receive, from the remote control, a channel up command or channel down command;
    select a first television channel selected from the preferred television channel list in response to: the channel up command or channel down command; and the television receiver being set to the preferred television channel mode;
    output the first television channel for presentation;
    receive a timer for a second television channel of the preferred television channel list from a television service provider; and
    record the second television channel for a period of time based on the timer received from the television service provider and the second television channel being listed on the preferred television channel list.

* * * * *